Nov. 9, 1954     R. O. CHAFFEE     2,693,875
FASTENER ASSEMBLY
Filed Dec. 1, 1950
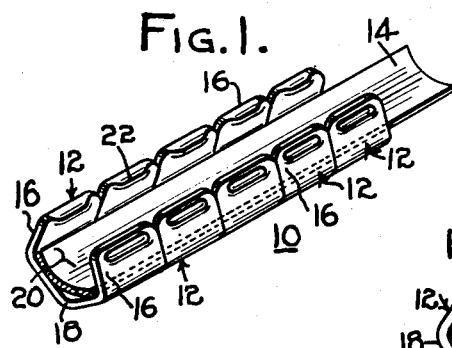
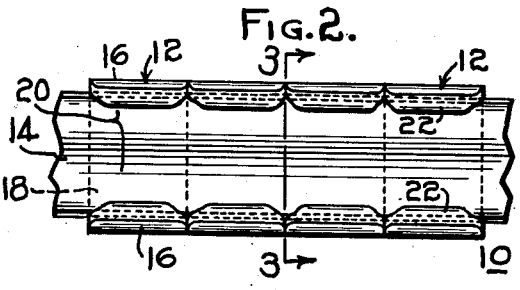
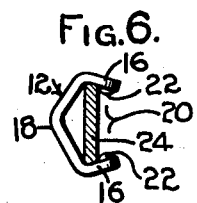
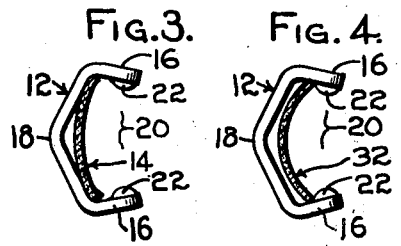
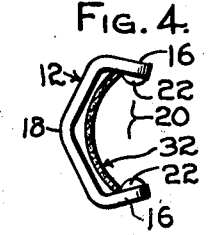
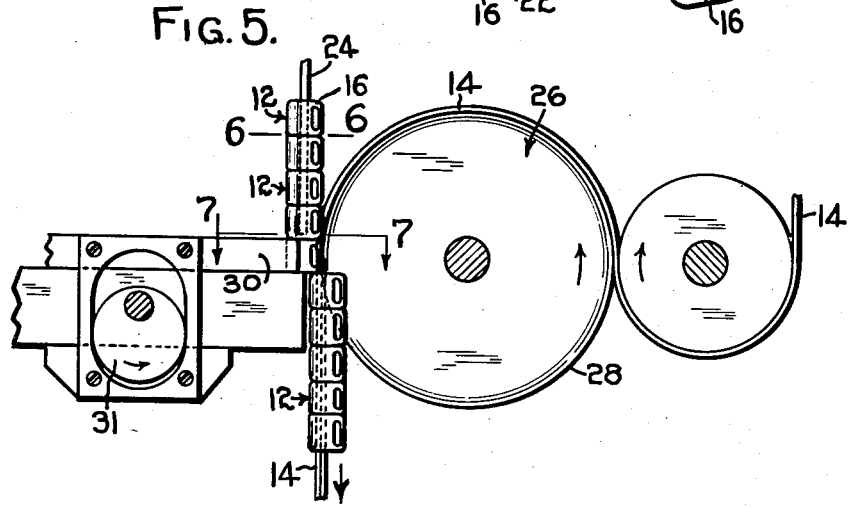
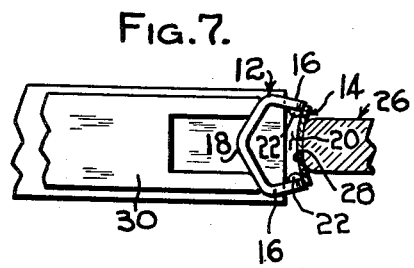
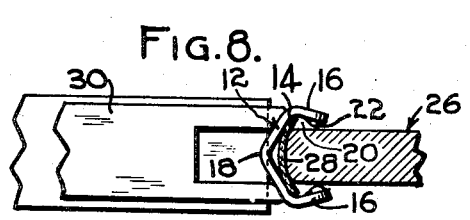
INVENTOR:
RAYMOND O. CHAFFEE,
By Robert E Ross
AGENT.

United States Patent Office 2,693,875
Patented Nov. 9, 1954

2,693,875

FASTENER ASSEMBLY

Raymond O. Chaffee, Belmont, Mass., assignor to United-Carr Fastener Corporation, Cambridge, Mass., a corporation of Massachusetts Application December 1, 1950, Serial No. 198,675

2 Claims. (Cl. 206—56)

This invention relates generally to fastening devices, and has particular reference to a fastener and fastener carrier tape assembly adapted to be fed into an automatic fastener attaching machine.

The object of the invention is to provide a fastener and carrier tape assembly in which a series of individual fasteners are mounted onto a carrier tape formed of resilient and flexible material in such a manner that they are securely retained thereon during shipment and handling, but may be easily removed by an automatic fastener attaching machine.

A further object of the invention is to provide a fastener and carrier tape assembly in which fastener members are regularly spaced and retained on a relatively stiff paper tape solely by engagement of the edges of the tape with opposing portions of the fastener.

A still further object of the invention is to provide a fastener and carrier tape assembly in which a series of fasteners are mounted on a resilient tape in such a manner that the tape is maintained in a transversely bowed condition between opposing portions of the fastener to cause frictional engagement between the edges of the tape and said opposing portions.

Another object of the invention is to provide a fastener and carrier tape assembly which is adapted to be rolled into a flat coil which is sufficiently stable to permit handling for feeding into a fastener attaching machine.

Other objects of the invention will, in part, be obvious, and will, in part, appear hereinafter.

In the drawing:

Fig. 1 is a perspective view of a fastener and tape assembly embodying the features of the invention;

Fig. 2 is a top plan view of the assembly of Fig. 1;

Fig. 3 is a view in section taken on line 3—3 of Fig. 2;

Fig. 4 is a view similar to Fig. 3 of a modified form of fastener and tape assembly;

Fig. 5 is a schematic view of a device for assembling the fasteners onto the tape;

Fig. 6 is a view in section taken on line 6—6 of Fig. 5;

Fig. 7 is a view in section taken on line 7—7 of Fig. 5; and

Fig. 8 is a view similar to Fig. 7 showing the operation of the device during assembly of a fastener onto the tape.

Referring to the drawing, there is illustrated a fastener and tape assembly 10, in which a series of fasteners 12 are mounted onto a carrier tape 14 of resilient and flexible material such as stiff paper or the like, to enable the fasteners to be continuously fed into an automatic fastener attaching machine.

In the illustrated embodiment, the fasteners 12 are of a type which are designed to be assembled onto the twisted neck of a plastic bag containing meat or fresh vegetables to seal the bag. The construction and use of this particular fastener is more fully described in a co-pending application Serial No. 190,770, filed by William A. Bedford, Jr., on October 18, 1950, and is shown here merely to illustrate a type of fastener which is particularly adapted for use in the present invention.

In general, the fastener 12 is U-shaped, with a pair of arms 16 extending in the same general direction from a connecting base portion 18. The arms 16 are spaced apart to form an aperture 20 therebetween, and are slightly inclined toward each other, so that the aperture is wider at the junction of the arms with the base than at the entrance. Each arm 16 is provided with an inwardly embossed portion or protuberance 22 near the ends thereof to engage the neck of the bag in a manner described in the above mentioned co-pending application, and said embossed portions further restrict the aperture 20.

The carrier tape 14 is preferably formed of relatively stiff resilient paper, and is wider than the greatest distance between the arms 16 of the fastener. The tape 14 is assembled into the aperture 20 so that the edges of the tape are in frictional engagement with the inner surfaces of the arms at the point where the distance therebetween is greatest, and since the tape is wider than this distance, it is maintained in a transversely bowed condition between the arms. (See Fig. 3.) The assembled fasteners are preferably spaced from each other on the tape a predetermined distance to prevent binding of adjacent fasteners when the assembly is rolled up for shipment.

The fasteners may be assembled onto the tape either manually or in an automatic machine. Referring to Fig. 5, there is illustrated a diagrammatic view of one type of machine which may be used for assembling the fasteners onto the tape. The fasteners are fed to a machine from a hopper (not shown) down a track 24 and positioned opposite a roller 26 having a transversely rounded peripheral face 28. The tape 14 is fed continuously into the machine so as to pass over the face 28 of the roller 26 and then downwardly out of the machine after the fasteners are assembled thereon. A ram 30 is provided opposite the roller 26, which is mounted with an eccentric cam 31 for imparting a reciprocating motion to the ram to cause it to move toward and away from the tape 14 passing over the roller.

When a fastener is in position for attachment as illustrated in Fig. 7, the ram 30 moves toward the tape, pushing the fastener forward, so that the arms 16 are positioned on opposite sides of the roller 26. (See Fig. 7.) Since the tape is wider than the distance between the arms, the edges of the tape are engaged by the arms, causing the edges to bend back on the curved face 28 of the roller. As the fastener is moved further forward by the ram, the edges of the resilient tape snap behind the embossed portions 22 of the arms and engage the inner surface of the arms at the junction of the arms with the base 18 which is the widest point of the aperture (see Fig. 8). Since the tape has been transversely bowed by the face 28 of the roller, it is retained in this condition by the arms 16, to increase the frictional engagement of the edges of the tape with the inner surface thereof.

By suitable design of the machine, the fasteners may be positioned on the tape in predetermined spaced relation to one another for purposes which have been hereinbefore described. The engagement of the edges of the tape with the fasteners not only retains the fasteners on the tape, but also restricts lateral sliding of the fastener thereon, so that the desired spacing of the fasteners is maintained.

Referring to Fig. 4, there is illustrated a modified form of the assembly, in which the fastener 12 is assembled onto a tape 32 which is wider than the tape hereinbefore described, so that the edges of the tape engage the fastener immediately behind the embossments 22. This modification provides a more positive engagement between the fastener and the tape.

The fastener and tape assembly of the invention is particularly advantageous for use with automatic machines for attaching the fasteners to a bag or other device, since the fasteners may be easily removed from the tape in the attaching machine by feeding the fastener and tape onto a track having a separating plough disposed thereon to force the tape out of engagement with the fasteners as they move along the track.

The method of assembly of the fastener onto the carrier tape insures that the fasteners will be properly aligned thereon, so that the assembly may be rolled up to form a flat coil with the fasteners seating properly on top of one another to impart rigidity and stability to the coil, to permit handling during mounting into the magazine of a fastener attaching machine.

Since certain other obvious modifications may be made in the device without departing from the scope of the invention, it is intended that all matter contained herein be interpreted in an illustrative and not in a limiting sense.

I claim:
1. A fastener assembly, comprising a normally flat tape of flexible and resilient material and a series of unconnected fasteners mounted on the tape, said fasteners having each a base portion and a pair of spaced arms of appreciable width forming an aperture and opposed inwardly extending embossed portions disposed transversely on said spaced arms to partially restrict the aperture, said tape having straight edges and being slightly wider between said edges than the distance between said spaced arms, said fasteners being mounted on the tape so that the tape is transversely bowed inwardly in the aperture with the edges behind and in contact with the inwardly extending portions and in frictional engagement with the spaced arms to prevent longitudinal movement of the fasteners on the tape, said inwardly extending portions extending an appreciable distance longitudinally of the tape.

2. A fastener assembly comprising a tape of flexible and resilient material and a series of unconnected fasteners mounted thereon, said fasteners each having a base portion and a pair of spaced arms of appreciable width extending therefrom in spaced relation to each other, said arms each having a transverse protuberance projecting from the inner surface thereof generally toward the other arm, said tape being slightly wider than the distance between said spaced arms, said fasteners being mounted on the tape so that the tape is transversely bowed inwardly between the arms with the edges of the tape being disposed behind and in contact with each said protuberance and in frictional engagement with the spaced arms to resist longitudinal movement of the fasteners on the tape.

References Cited in the file of this patent

UNITED STATES PATENTS

| Number | Name | Date |
|---|---|---|
| 1,519,738 | McGowan | Dec. 16, 1924 |
| 1,660,644 | Coats | Feb. 28, 1928 |
| 1,665,051 | Briggs | Apr. 3, 1928 |
| 1,909,126 | Satterthwaite | May 16, 1933 |
| 1,913,864 | Walper | June 13, 1933 |
| 2,062,098 | MacChesney | Nov. 24, 1936 |
| 2,127,665 | Leslie | Aug. 23, 1938 |
| 2,241,834 | Wentz | May 13, 1941 |
| 2,393,514 | Bicknell | Jan. 22, 1946 |
| 2,420,783 | Koester | May 20, 1947 |
| 2,566,062 | Jaeger | Aug. 28, 1951 |